(12) United States Patent
Mayo et al.

(10) Patent No.: US 8,109,435 B2
(45) Date of Patent: Feb. 7, 2012

(54) IDENTITY VERIFICATION SWITCH

(75) Inventors: Richard Mayo, Cave Creek, AZ (US);
Glen Sgambati, Glendale, AZ (US);
Robert Perrotta, Scottsdale, AZ (US)

(73) Assignee: Early Warning Services, LLC,
Scottsdale, AZ (US)

( * ) Notice: Subject to any disclaimer, the term of this patent is extended or adjusted under 35 U.S.C. 154(b) by 604 days.

(21) Appl. No.: 11/183,167

(22) Filed: Jul. 14, 2005

(65) Prior Publication Data

US 2007/0012757 A1 Jan. 18, 2007

(51) Int. Cl.
G06Q 40/00 (2006.01)
G06Q 20/00 (2006.01)
G07D 11/00 (2006.01)
G07F 19/00 (2006.01)
G06K 5/00 (2006.01)
G06F 7/08 (2006.01)

(52) U.S. Cl. ......... 235/380; 235/379; 235/381; 705/39; 705/44; 705/79; 705/40

(58) Field of Classification Search ............ 705/39, 705/45, 79, 40, 44; 235/379–381
See application file for complete search history.

(56) References Cited

U.S. PATENT DOCUMENTS

| | | | |
|---|---|---|---|
| 5,175,682 A | 12/1992 | Higashiyama et al. | |
| 5,265,007 A | 11/1993 | Barnhard, Jr. et al. | |
| 5,355,413 A * | 10/1994 | Ohno ........................... | 713/159 |
| 5,404,488 A | 4/1995 | Kerrigan et al. | |
| 5,679,938 A | 10/1997 | Templeton et al. | |
| 5,679,940 A | 10/1997 | Templeton et al. | |
| 5,819,236 A | 10/1998 | Josephson | |
| 5,832,463 A | 11/1998 | Funk | |
| 5,832,464 A | 11/1998 | Houvener et al. | |
| 5,878,416 A * | 3/1999 | Harris et al. ..................... | 705/28 |
| 5,920,848 A | 7/1999 | Schitzer et al. | |
| 5,966,698 A | 10/1999 | Pollin | |
| 5,983,380 A | 11/1999 | Motika et al. | |
| 6,085,168 A * | 7/2000 | Mori et al. ....................... | 705/17 |
| 6,119,103 A | 9/2000 | Basch et al. | |
| 6,189,785 B1 | 2/2001 | Lowery | |
| 6,351,735 B1 | 2/2002 | Deaton et al. | |
| 6,442,714 B1 * | 8/2002 | Griffin et al. .................... | 714/46 |
| 6,496,936 B1 * | 12/2002 | French et al. .................... | 726/7 |

(Continued)

OTHER PUBLICATIONS

"BB&T, Star Systems and International Check Services Successfully Complete First Safecheck Transactions," News Release dated Aug. 24, 2000, printout from website http://www.intlcheck.com/pages/pressure/20000824.html, 2 pages, printout date Mar. 4, 2002.

(Continued)

*Primary Examiner* — Daniel Walsh
(74) *Attorney, Agent, or Firm* — Kilpatrick Townsend & Stockton LLP

(57) ABSTRACT

Methods, systems, and machine-readable media are disclosed for an identity verification switch. According to one embodiment, the method comprises receiving from an inquirer a request to verify an identity of an individual initiating a transaction. The request includes account information for an account subject to the transaction and identity information for the individual initiating the transaction. Based on the request, a verifying financial institution is selected from one or more participating financial institutions. The request is forwarded to the verifying financial institution for verification of the identity information. An answer is received from the verifying financial institution indicating results of verification of the identity information. The answer is returned to the inquirer.

14 Claims, 7 Drawing Sheets

U.S. PATENT DOCUMENTS

| | | | |
|---|---|---|---|
| 6,622,270 B2* | 9/2003 | Beffa | 714/718 |
| 6,629,081 B1 | 9/2003 | Cornelius et al. | |
| 6,647,376 B1* | 11/2003 | Farrar et al. | 705/45 |
| 6,675,153 B1* | 1/2004 | Cook et al. | 705/74 |
| 6,754,640 B2 | 6/2004 | Bozeman | |
| 6,783,065 B2* | 8/2004 | Spitz et al. | 235/380 |
| 6,785,661 B1* | 8/2004 | Dixon et al. | 705/39 |
| 6,873,974 B1 | 3/2005 | Schutzer | |
| 7,004,382 B2* | 2/2006 | Sandru | 235/379 |
| 7,100,821 B2* | 9/2006 | Rasti | 235/380 |
| 7,165,051 B2* | 1/2007 | Ronning et al. | 705/64 |
| 7,177,846 B2 | 2/2007 | Moenickheim et al. | |
| 7,231,657 B2 | 6/2007 | Honarvar et al. | |
| 7,287,689 B2* | 10/2007 | Tidwell et al. | 235/379 |
| 7,337,953 B2 | 3/2008 | Sgambati et al. | |
| 7,398,925 B2* | 7/2008 | Tidwell et al. | 235/440 |
| 7,512,221 B2 | 3/2009 | Toms | |
| 7,527,195 B2* | 5/2009 | Keithley et al. | 235/380 |
| 7,539,644 B2 | 5/2009 | Hu et al. | |
| 7,783,563 B2* | 8/2010 | Tidwell et al. | 705/38 |
| 7,905,396 B2* | 3/2011 | Tidwell et al. | 235/379 |
| 2002/0016763 A1 | 2/2002 | March | |
| 2002/0019827 A1 | 2/2002 | Shiman et al. | |
| 2002/0026396 A1 | 2/2002 | Dent et al. | |
| 2002/0046341 A1* | 4/2002 | Kazaks et al. | 713/182 |
| 2002/0052852 A1* | 5/2002 | Bozeman | 705/64 |
| 2002/0065784 A1 | 5/2002 | Ranzini et al. | |
| 2002/0087467 A1* | 7/2002 | Mascavage et al. | 705/39 |
| 2002/0099649 A1* | 7/2002 | Lee et al. | 705/38 |
| 2002/0103756 A1 | 8/2002 | Andrews et al. | |
| 2002/0120506 A1* | 8/2002 | Hagen | 705/14 |
| 2002/0120846 A1 | 8/2002 | Stewart et al. | |
| 2002/0144187 A1* | 10/2002 | Morgan et al. | 714/43 |
| 2002/0178112 A1* | 11/2002 | Goeller et al. | 705/39 |
| 2003/0050986 A1 | 3/2003 | Matthews et al. | |
| 2003/0115189 A1 | 6/2003 | Srinivasa et al. | |
| 2003/0115470 A1 | 6/2003 | Cousins et al. | |
| 2003/0130919 A1 | 7/2003 | Templeton et al. | |
| 2003/0138084 A1* | 7/2003 | Lynam et al. | 379/114.14 |
| 2003/0149660 A1* | 8/2003 | Canfield | 705/39 |
| 2003/0187786 A1* | 10/2003 | Swift et al. | 705/39 |
| 2003/0187796 A1* | 10/2003 | Swift et al. | 705/45 |
| 2003/0200118 A1* | 10/2003 | Lee et al. | 705/2 |
| 2003/0216934 A1 | 11/2003 | Pfoertner | |
| 2003/0216988 A1* | 11/2003 | Mollett et al. | 705/35 |
| 2003/0217003 A1 | 11/2003 | Weinflash et al. | |
| 2004/0019564 A1* | 1/2004 | Goldthwaite et al. | 705/44 |
| 2004/0019568 A1 | 1/2004 | Moenickheim et al. | |
| 2004/0064401 A1 | 4/2004 | Palaghita et al. | |
| 2004/0098339 A1 | 5/2004 | Malek et al. | |
| 2004/0122769 A1 | 6/2004 | Bailo et al. | |
| 2004/0153403 A1* | 8/2004 | Sadre | 705/39 |
| 2004/0153514 A1 | 8/2004 | Crane | |
| 2004/0153663 A1 | 8/2004 | Clark et al. | |
| 2004/0191746 A1* | 9/2004 | Maron et al. | 434/323 |
| 2004/0236692 A1* | 11/2004 | Sellen et al. | 705/45 |
| 2005/0021476 A1 | 1/2005 | Candella et al. | |
| 2005/0033695 A1* | 2/2005 | Minowa | 705/45 |
| 2005/0038751 A1* | 2/2005 | Gaetano, Jr. | 705/59 |
| 2005/0055296 A1 | 3/2005 | Hattersley et al. | |
| 2005/0075977 A1 | 4/2005 | Carroll et al. | |
| 2005/0125296 A1* | 6/2005 | Tidwell et al. | 705/16 |
| 2005/0125360 A1* | 6/2005 | Tidwell et al. | 705/65 |
| 2005/0131816 A1 | 6/2005 | Britto et al. | |
| 2005/0234820 A1 | 10/2005 | MacKouse | |
| 2005/0279827 A1* | 12/2005 | Mascavage et al. | 235/380 |
| 2006/0212407 A1* | 9/2006 | Lyon | 705/71 |
| 2006/0224470 A1* | 10/2006 | Garcia Ruano et al. | 705/27 |
| 2006/0226216 A1* | 10/2006 | Keithley et al. | 235/379 |
| 2006/0229996 A1* | 10/2006 | Keithley et al. | 705/75 |
| 2006/0271457 A1 | 11/2006 | Romain et al. | |
| 2007/0000994 A1* | 1/2007 | Michelassi et al. | 235/379 |
| 2007/0106558 A1 | 5/2007 | Mitchell et al. | |
| 2007/0138257 A1* | 6/2007 | Dragt et al. | 235/379 |
| 2007/0198361 A1* | 8/2007 | Ronning et al. | 705/26 |
| 2007/0198403 A1 | 8/2007 | Aloni et al. | |
| 2007/0288641 A1* | 12/2007 | Lee et al. | 709/227 |
| 2007/0291996 A1* | 12/2007 | Hoffman et al. | 382/115 |
| 2008/0027865 A1* | 1/2008 | Usui et al. | 705/50 |
| 2008/0046368 A1* | 2/2008 | Tidwell et al. | 705/44 |
| 2009/0006230 A1* | 1/2009 | Lyda et al. | 705/35 |
| 2011/0082708 A1* | 4/2011 | Pourfallah | 705/3 |

OTHER PUBLICATIONS

"Star Chek Goes Live with Online Check Verification," News Release dated Jan. 16, 2001, Star Systems, Inc., printout from website: http://www.star-systems.com/cfm/news-press.cfm?id=42, 2 pages, printout date: Feb. 20, 2002.

PPS—Deposit Chek® "Deposit Chek," printout from website: http://.64.78.123/dchek.htm, 2 pages, printout date: Mar. 20, 2002.

PPS Deposit Chek® "Preventing Check Losses at Credit Unions," 2 pages, Sep. 20, 2001

"Financial Institution Letters, Special Alert," dated Mar. 22, 2000, printout from FDIC website: http://www.fdic.gov/news/financial/2000/fil0019/html, 1 page, printout date: Mar. 8, 2002.

"Thomson Bank InfoLink™," Thomson Financial Publishing, 2 pages, date unknown.

"eFunds Counts on SAS to Lower Risks for Banks and Retailers," printout from SAS website: http://www.sas.com/news/success/efunds.html, 2 pages, printout date: Mar. 8, 2002.

"About ChexSystems," printout from ChexSystems website: http://www.chexhelp.com/English/public/about.htm, 1 page, printout date: Mar. 8, 2002.

"ChexSystems And Deluxe Corp.," printout from CardReport website: http://www.cardreport.com/overview/bureaus/chexsystems,htm, 3 pages, printout date: Mar. 8, 2002.

"Electronic Clearing House to Power Point-of-Sale Check Service Program," ECHO Press Release dated Jul. 16, 2001, printout from website: http://www.echo-inc.com/press_115.html, 3 pages, printout date: Mar. 12, 2002.

"TeleCheck® Verification Services," printout from TeleCheck website: http://www.telecheck.com/products/verification.html, 1 page, printout date: Mar. 8, 2002.

"SCANSM and SCAN OnLineSM ," printout from eFUNDS website: http://www.efunds.com/us/en/solutions/comp_a2z/pm/001118.cnt, 1 page, printout date: Mar. 4, 2002.

SCAN Consumer Help, "Welcome to the SCANSM Consumer Assistance Center," Deposit Payment Protection Services, Inc., copyright date: 1999, printout from website: http://www.scanassist.com/scanassist. html, 1 page, printout date: Mar. 8, 2002.

CheckAGAIN Production Information, "Centralized Returns," printout from CheckAGAIN, LLC website: http://www.checkagain.com/returns.asp, 1 page, printout date: Mar. 8, 2002.

CheckAGAIN Product Information, "Check Authorizations," printout from CheckAGAIN, LLC website: http://www.checkagain.com/authorizations.asp, 1 page, printout date: Mar. 8, 2002.

"CheckAGAIN Adds Leading National Authorization Database to Services," News Release dated Jan. 30, 2001, printout from CheckAGAIN, LLC website: http://checkagain.com/press010301.asp, 2 pages, printout date: Mar. 8, 2002.

"CheckAGAIN Adds ECHO's NCIS Database to Service," News Release from ECHO, 1 page, Mar. 27, 2001.

"Operation Gold Rush Leads To Arrest of Eight Defendants Charged in Massive Credit Card Scam that Cost Banks up to $15 Million," News Release No. 99-038 from Department of Justice, 2 pages, Feb. 23, 1999.

"Compliance with Regulation CC," printout from The Federal Reserve Board website: http://www.federalreserve.gov/pubs/regcc/regcc/htm, last update of website page: Jul. 25, 2001, 6 pages, printout date: Apr. 18, 2002.

"Welcome to PayByCheck! The leading provider of electronic check processing," printout from PayByCheck website: http://www.paybycheck.com, 2 pages, printout date: Sep. 18, 2003.

"Customized Internet Solutions for Small Business People," printout from website: http://www.tconsult.com/address_verification.aspx, 3 pages, printout date: Sep. 18, 2003.

"About SCANSM," printout from website: http://www.scanassist.com/about.html, 1 page, printout date: Mar. 8, 2002.

"Secure Seal™—A Product Guide," EnSeal Systems Ltd., 3 pages, 2003.

U.S. Appl. No. 10/773,642 Office Action dated Feb. 19, 2008, 17 pages.
Early Warning Website, "Remittance Risk Service" obtained from the internet on Jul. 24, 2008, 4 pages.
PR NewsWire, "Experian Launches Collections Solution to Monitor, Locate and Collect Unpaid Receivables", Costa Mesa, CA, obtained from internet on Jul. 23, 2008, 6 pages.
U.S. Appl. No. 11/772,604 Office Action dated Aug. 5, 2008, 23 pages.
U.S. Appl. No. 11/772,604 Final Office Action dated Jan. 26, 2009, 31 pages.
U.S. Appl. 11/772,604 Advisory Action dated Apr. 13, 2009, 3 pages.
U.S. Appl. No. 10/773,642 Final Office Action dated May 11, 2009, 20 pages.
U.S. Appl. No. 10/773,642 Office Action dated Oct. 16, 2009, 26 pages.
U.S. Patent Application 10/773,642 Final Office Action dated Mar. 24, 2010, 25 pages.
U.S. Appl. No. 11/772,604 Office Action dated Jul. 29, 2009, 35 pages.
U.S. Appl. No. 11/772,604 Final Office Action dated Jan. 5, 2010, 37 pages.
U.S. Appl. No. 11/772,604 Advisory Action dated Mar. 23, 2010, 3 pages.
U.S. Appl. No. 11/150,447 Office Action dated Jun. 23, 2009, 19 pages.
U.S. Appl. No. 11/150,447 Final Office Action dated Jan. 5, 2010, 18 pages.
Experian's Collection Triggers: "Experian Launches Collections Solution to Monitor, Locate and Collect Unpaid Receivables," Feb. 11, 2006, Triggers SM Feb. 2007.
U.S. Appl. No. 11/772,604 Office Action dated Aug. 4, 2010, 24 pages.

* cited by examiner

IDENTITY VERIFICATION SWITCH

BACKGROUND OF THE INVENTION

Numerous losses to merchants and/or financial institutions occur due to identity theft, counterfeiting, and account takeovers. With the rapid growth in Internet transactions and E-Check payments, fraud perpetrators can conduct fraud remotely when they want, where the want, and with no face-to-face contact. Because of the anonymity, reach and speed that the Internet provides for fraud perpetrators, risk management and fraud prevention are increasingly important and valuable. For example, with the increase of web transactions, (non face-to-face transactions), efforts to identify the person conducting the transaction as an authorized user of the account is important to help mitigate losses from identity theft and account take-over. Similarly, identification of an authorized account owner for new account funding opening deposits and account to account transfers, processed through financial services companies, is beneficial for preventing losses as well as for customer convenience.

In order to reduce the risk of losses due to fraud, banks, merchants, and other entities routinely verify information related to a particular financial account when conducting transactions with that account. For example, payment processors and financial service companies verify checking account information for a consumer wishing to make a transaction using that account. Such transactions occur in a variety of forms, including traditional paper checks, debit cards, electronic checks, or Automated Clearing House system transactions.

Presently, verification systems exist which include a centralized database populated with account information contributed directly by participating banks and institutions. These systems provide advance notification of potential check returns to participating financial institutions by allowing financial institutions inquiry to a national shared account and transaction database (NSD), which is contributed to by major financial institutions and updated daily, and which includes the most current checking account status information as well as check level detail on returned items and stop payments. The information stored in the NSD is intended to be available to inquirers receiving funds by check or electronic payment in sufficient time to enable them to avoid loss that might result from non-payment. The NSD thus stores information about each participant institutions checking accounts, such that, if queried about a particular participant bank's account, the database may return the status (e.g., closed, overdrawn, high check return rate, new account) of that account to the inquirer. The inquirer (such as a merchant or depository bank) may then decide how they want to handle the transaction (e.g., merchants and financial institutions may decide whether to accept the check and financial institutions may decide whether to place an "extended hold" on the checking account). Inquiries may take place immediately (i.e., in real time) or in overnight batch processes.

Additionally, the NSD can include identity information related to individuals authorized to use the account. For instance, the NSD can maintain names of authorized individuals for each account. Such information can be used to verify that a particular individual is authorized to conduct a given transaction on a specific account, prior to completion of the transaction.

However, because of the account and identity information such a centralized database holds, it presents an attractive target for hackers, thieves, and other assorted miscreants. Typically, such a centralized database will be protected by the best firewalls, encryption, and other security technology available to prevent unauthorized access and/or theft of the information stored therein. Nevertheless, some financial institutions may be reluctant to contribute account information to such a centralized system for fear of the information being stolen or misused.

BRIEF SUMMARY OF THE INVENTION

Methods, systems, and machine-readable media are disclosed for an identity verification switch. According to one embodiment, the method comprises receiving from an inquirer a request to verify account ownership and, thus, authorized use of the account based on the identity of an individual initiating a transaction. The request can include account information for an account subject to the transaction and identity information for the individual initiating the transaction. Based on the request, a verifying financial institution can be selected from one or more participating financial institutions. The request can be forwarded to the verifying financial institution for verification of the identity information and the linkage of the account owner(s) to the account. An answer can be received from the verifying financial institution indicating results of verification of the identity information. The answer can be returned to the inquirer.

The account information from the request can include a Routing Transit (RT) number and account number. In this case, selecting the verifying financial institution from one or more participating financial institutions can be based on the RT number.

Verification of the identity information can comprise determining whether the individual is authorized to conduct transactions on the account based on the identity information from the request and account information maintained by the verifying financial institution. The answer can include positive indications corresponding to identity information from the request that matches identity information for individuals authorized to conduct transactions on the account maintained by the verifying financial institution. The answer can include negative indications corresponding to identity information from the request that does not match identity information for individuals authorized to conduct transactions on the account maintained by the verifying financial institution. The answer can include cautionary indications corresponding to identity information from the request that is not found in identity information for individuals authorized to conduct transactions on the account maintained by the verifying financial institution.

According to another embodiment, a system can comprise a processor and a memory communicatively connected with and readable by the processor. The memory can contain instructions which, when executed by the processor, cause the system to receive from an inquirer a request to verify account ownership of an individual initiating a transaction. The request can include account information for an account subject to the transaction and identity information for the individual initiating the transaction. Based on the request, a verifying financial institution can be selected from one or more participating financial institutions. The request can be forwarded to the verifying financial institution for verification of the identity information. An answer can be received from the verifying financial institution indicating results of verification of the identity information and linkage to the account owner(s). The answer can be returned to the inquirer.

According to yet another embodiment, a machine-readable medium can have stored thereon a series of executable instructions which, when executed by a processor, cause the processor to receive from an inquirer a request to verify account ownership of an individual initiating a transaction. The request can include account information for an account subject to the transaction and identity information for the individual initiating the transaction. The account information can comprise a Routing Transit (RT) number and an account number. A verifying financial institution can be selected from one or more participating financial institutions based on the RT number. The request can be forwarded to the verifying financial institution for verification of the identity information. An answer can be received from the verifying financial institution indicating results of verification of the identity information and the answer can be returned to the inquirer.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Figure 1:
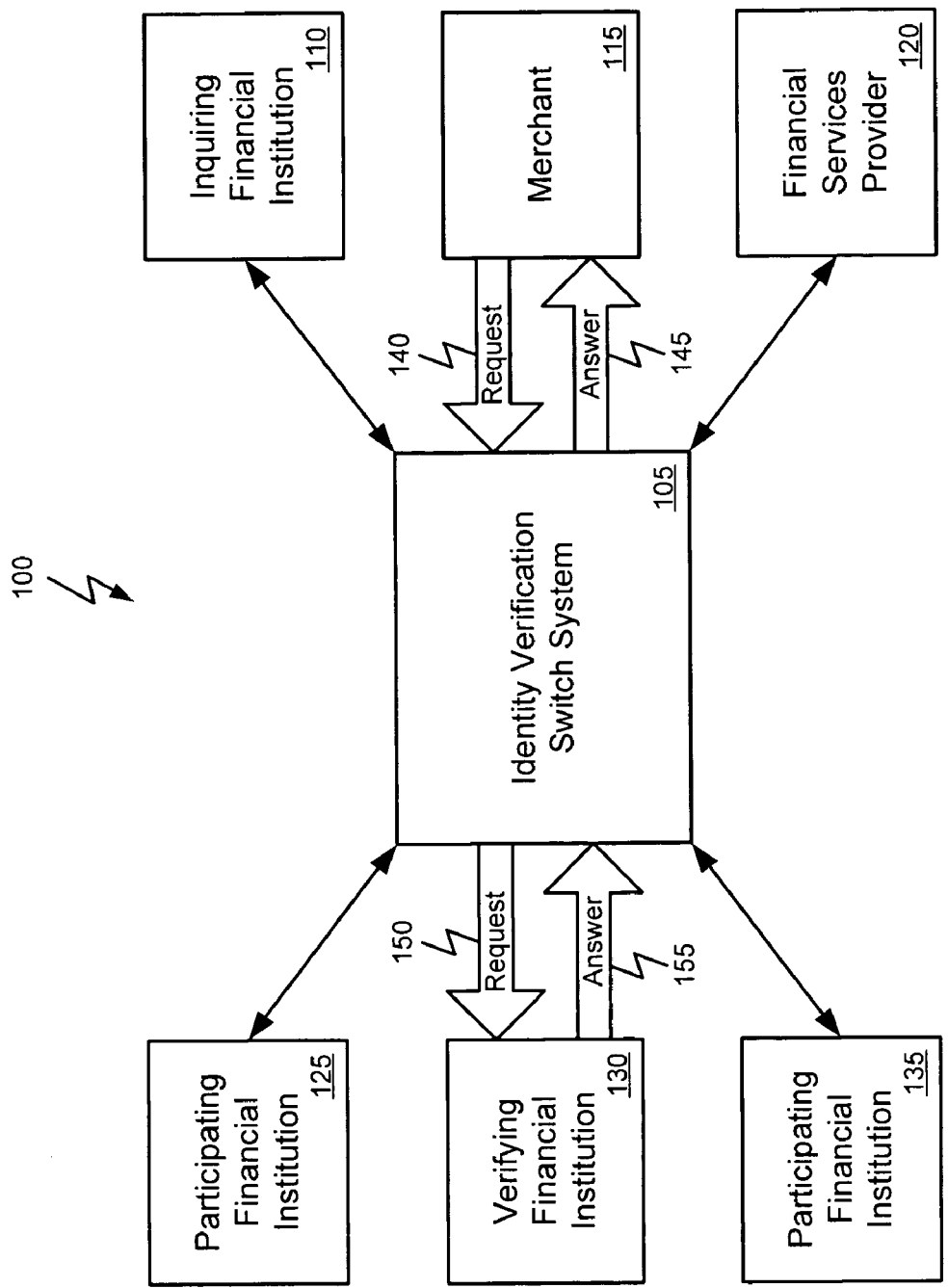
FIG. 1 is a block diagram conceptually illustrating an exemplary environment in which an identity verification switch system may be implemented according to one embodiment.

FIG. 1 conceptually illustrates an exemplary environment in which an identity verification switch system may be implemented according to one embodiment. In this example, the environment 100 includes an identity verification switch system 105, a number of participant financial institutions 125-135, and a number of inquirers 110-120. The inquirers 110-120 and participating financial institutions 125-135 may be communicatively connected with the identity verification switch system 105 in a variety of ways including, but not limited to, a wire or wireless Local Area Network (LAN), Wide Area Network (WAN), the Internet, or other common communications media.

As used herein, the term inquirer can refer to an entity requesting confirmation or verification of account information for a particular individual or other entity. For example, inquirers 110-120 can comprise one or more financial institutions 110, one or more merchants 115, one or more financial service providers 120, and/or other types of entities. Inquiring financial institutions 110 may be any type of financial institution such as banks, credit card companies, lenders, etc. Merchants 115 may comprise online or storefront retailers, wholesalers, etc. Financial services providers 120 may be brokerages, mortgage companies, and other types of entities offering various types of financial services.

Generally speaking, an inquirer, such as merchant 115, considering conducting a sale or other transaction with an individual or other entity can submit a request 140 to identity verification switch system 105. The request 140 may include account and other information presumably related to the individual or other entity. As will be seen, the identity verification switch system 105 then sends a request 150 to one of the participating financial institutions 125-135 for verification of the information contained in the request 150.

The term participant financial institution can refer to an entity communicatively connected with the identity verification switch system 105 to assist the identity verification switch system 105 in confirming or verifying account and identity information. For example, verifying financial institution 130 may represent a bank in which an individual or other entity holds a checking account. When, for example, this individual or entity tries to pay merchant 115 with a check drawn on this account and identity verification switch system 105 has received a request 140 to verify account and/or other information related to this individual, identity verification switch system 105 can forward the request 150 to the verifying financial institution 130 upon which the check is drawn for assistance in the verification process. In this way, the identity verification switch system 105 maintains information for routing verification requests 140 from inquirers 110-120 to the appropriate participating financial institution 125-135 but does not need to maintained detailed information about individual accounts. In other cases, a different participating financial institution may act as the verifying financial institution. That is, the identity verification switch system 105 can select a verifying financial institution from among the participating financial institutions 125-135 based on the account information from the request 140.

Some entities connected with the identity verification switch system 105 can act as an inquirer 110-120, a participating financial institution 125-135, or a verifying financial institution at any given time. For example, financial institution 110, when presented with a check drawn on an account from participating financial institution 125 can act as an inquirer of identity verification switch system 105 while financial institution 125 acts as a verifying financial institution. However, these roles may be reversed when financial institution 125 is presented with a check drawn on an account from financial institution 110.

Therefore, in operation, an inquirer such as merchant 115 may send information for verification to identity verification switch system 105 via request 140. The information in the request 140 may include account information such as a routing transit number, an account number, etc. as well as identity information such as a name, phone number, address, Social Security number, date of birth, etc related to an individual or entity initiating a transaction.

Identity verification switch system 105 maintains a database of information that it uses to identify a financial institution associated with the account information from the request 140. For example, identity verification switch system 105 maintains a list of routing numbers and associated financial institutions. Therefore, identity verification switch system 105 need not maintain detailed information regarding the account or the holder of that account. Rather, the identity verification switch system sends the account and identity information from the inquirer to the appropriate participant financial institution for verification. The verifying financial institution 130 then receives the request 150 information from the identity verification switch system 105 and performs a verification of the account info and personal info.

The verifying financial institution 130 receives the request 150 from the identity verification switch 105 and verifies the account and identity information from the request 150 based on account information in one or more lists or databases maintained by the verifying financial institution 130. That is, the verifying financial institution 130 can look-up or search for account and identity information based on the account information from the request and compare the account and identity information from the request with that stored by the verifying financial institution.

In one embodiment, verifying financial institution 130 may return an answer 155 with verification of each submitted data element corresponding to the account identified by the account information in the request 150. By way of example, for each data element in an inquiry, a response of "yes", "no" or "information not available" may be returned to the inquirer. A positive response (e.g., "Y" or "yes") may be received if the entered data element matches the content of a corresponding data element in an account database for the indicated account. Similarly, a negative (e.g., "N" or "no" response) may be returned to the inquirer if the entered data element does not match the content of the corresponding data element in the account database for the indicated account. An "unavailable information" or other cautionary response may be received if the data element in account database corresponding to the indicated account is empty. The complete response received by the inquirer may contain one or more of each of the possible responses. That is, verifying financial institution 130 may respond according to each individual data element from the request 150. According to some embodiments, account-specific data may not be provided back to the inquirer in the answer 155. Rather, the verifying financial institution 130 may only confirm or deny the accuracy of the information received in the request 150 as it corresponds to the account. An exemplary request 150 and answer 155 will be discussed in detail below with reference to FIG. 7.

In one example, if Mr. John Doe writes a check to pay for goods purchased from merchant 115, merchant 115 can collect some identifying information from Mr. Doe such as his name, address, Social Security Number (SSN), Date of Birth (DOB), etc. Then, prior to completing the sale, merchant 115 can send account information for the account subject to the transaction, i.e., the account Mr. Doe is using to pay to merchant 115, and Mr. Doe's identity information to identity verification switch system 105. Identity verification switch system 105 can determine from the routing number that Mr. Doe's checking account is held by financial institution 130. The identity verification switch system 105 can then forward the account information and identity information to the appropriate verifying financial institution 130.

Upon receipt of this request 150 from the identity verification switch system 105, verifying financial institution 130 verifies both the account information and the identity information from the request 150. For example, the verifying financial institution 130 can look up identity information associated with the account and compare the identity information submitted by Mr. Doe with the stored information for the account. Verifying financial institution 130 can then, based on the results of the verification process, generate an answer indicating positive, negative, and/or cautionary results for elements of the request 150 and return the answer to the identity verification switch system 105.

Upon receipt of the answer 155, identity verification switch system 105 returns the answer 145 to the inquirer, in this example, merchant 115. Merchant 115 can then read the answer and determine whether to complete the sale to Mr. Doe. If all items related to Mr. Doe matched and were verified, merchant 115 may expect minimal risk and can decide to complete the transaction.

In another example, Mr. Doe may try to do a credit card cash advance and deposit the funds into a checking account he owns at a financial institution 125. So, the credit card issuer 110 can generate a request including the routing transit number, account number and some identity information for Mr. Doe such as name, SSN, DOB, address, etc. This request can be sent to the identity verification switch system 105 to be forwarded to the appropriate verifying financial institution (i.e., 125-135) based on the account information from the request. The answer from the verifying financial institution may indicate, for example, that the name or other identity information associated with the account does not match Mr. Doe's information possibly indicating fraudulent use of the credit card. In such a case, the inquirer can decide to investigate further before completing the transaction or can decide to not complete the transaction as it may be fraudulent or otherwise lead to losses. In another example, the answer may indicate that the name associated with the account matches Mr. Doe, but the address does not match. This may indicate that Mr. Doe recently moved but has not yet changed his address with his financial institution. However, it may also indicate a more serious problem and perhaps even fraud by Mr. Doe. Therefore, the inquirer may decide to investigate further by requesting additional information from Mr. Doe before proceeding with the transaction.

Figure 2:
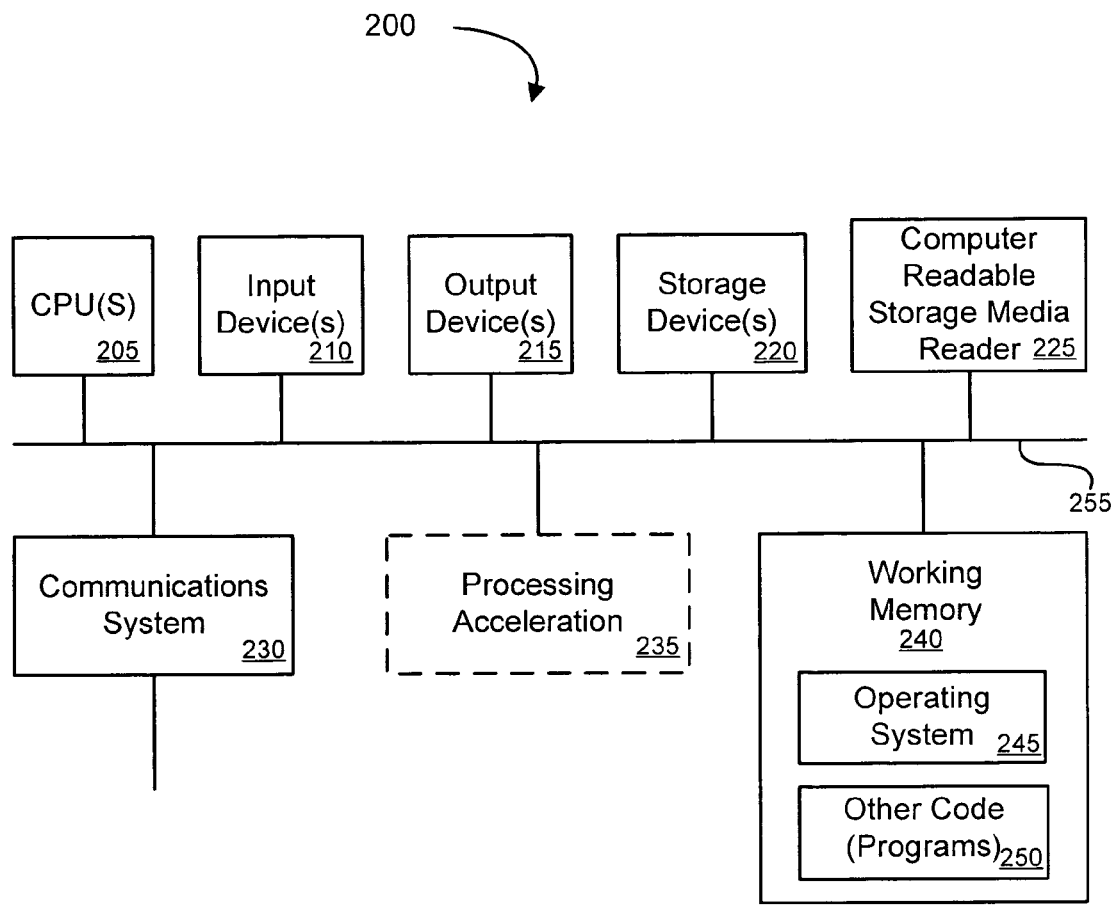
FIG. 2 is a block diagram illustrating an exemplary computer system upon which various elements of the exemplary environment illustrated in FIG. 1 may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
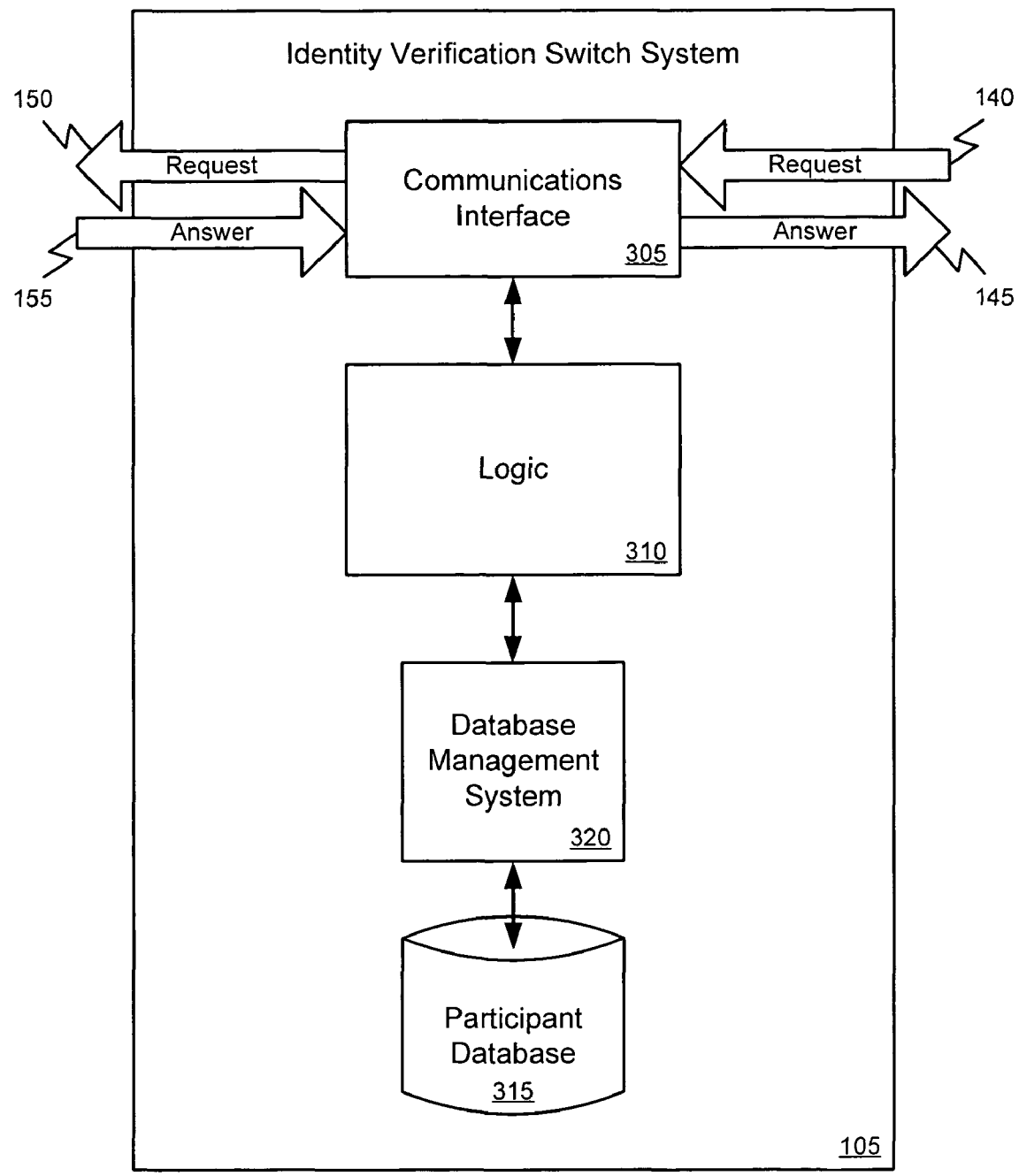
FIG. 3 is a block diagram illustrating functional components of an identity verification switch system according to one embodiment.

FIG. 3 is a block diagram illustrating functional components of an identity verification switch system according to one embodiment. As illustrated in this example, the identity verification switch system 105 includes logic 310 communicatively coupled with communications interface 305, participate database 315, and a database management system 320. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that the components 305-320 of identity verification switch system 105 may reside on the same or different physical devices.

Communications interfaces 305 may be used to receive requests 140 from inquirers requesting verification of identity information associated with an account subject to a transaction. In some instances, received communications may be batch communications requesting verification of a plurality of identities. Communications interfaces 305 may also be used to transmit verification requests 150 to participating financial institutions, receive answers 155 or results from the participating financial institutions and return the answers 145 to the inquirers. In some embodiments, communications interface 305 may include an interface to a wide area network (WAN), such as the Internet, or proprietary networks. Alternative or additional types of interfaces may also be included as components of communications interface 305.

Logic 310 may be used to process requests to verify account and identity information. Logic 310 may interact with participant database 315 via database management system 320 to search for or select a verifying financial institution based on the account information from the request. In some embodiments, logic 310 may interact directly with participant database 315 to select a verifying financial institution. It should be appreciated that logic 310 may be one or more software programs, one or more components of a software program (e.g., function or program object), firmware, or other type of machine-executable instructions.

Participant database 315 may include information used to determine which participant financial institution maintains a particular account indicated in a request from an inquirer. This information may include a list of Routing Transit (RT) numbers and associated participating financial institutions. The participant database 315 may alternatively or additionally include a list of issuers or otherwise related financial institutions. Additional details of the processes and functions performed by identity verification switch system 105 will be discussed below with reference to FIGS. 4 and 5

Figure 4:
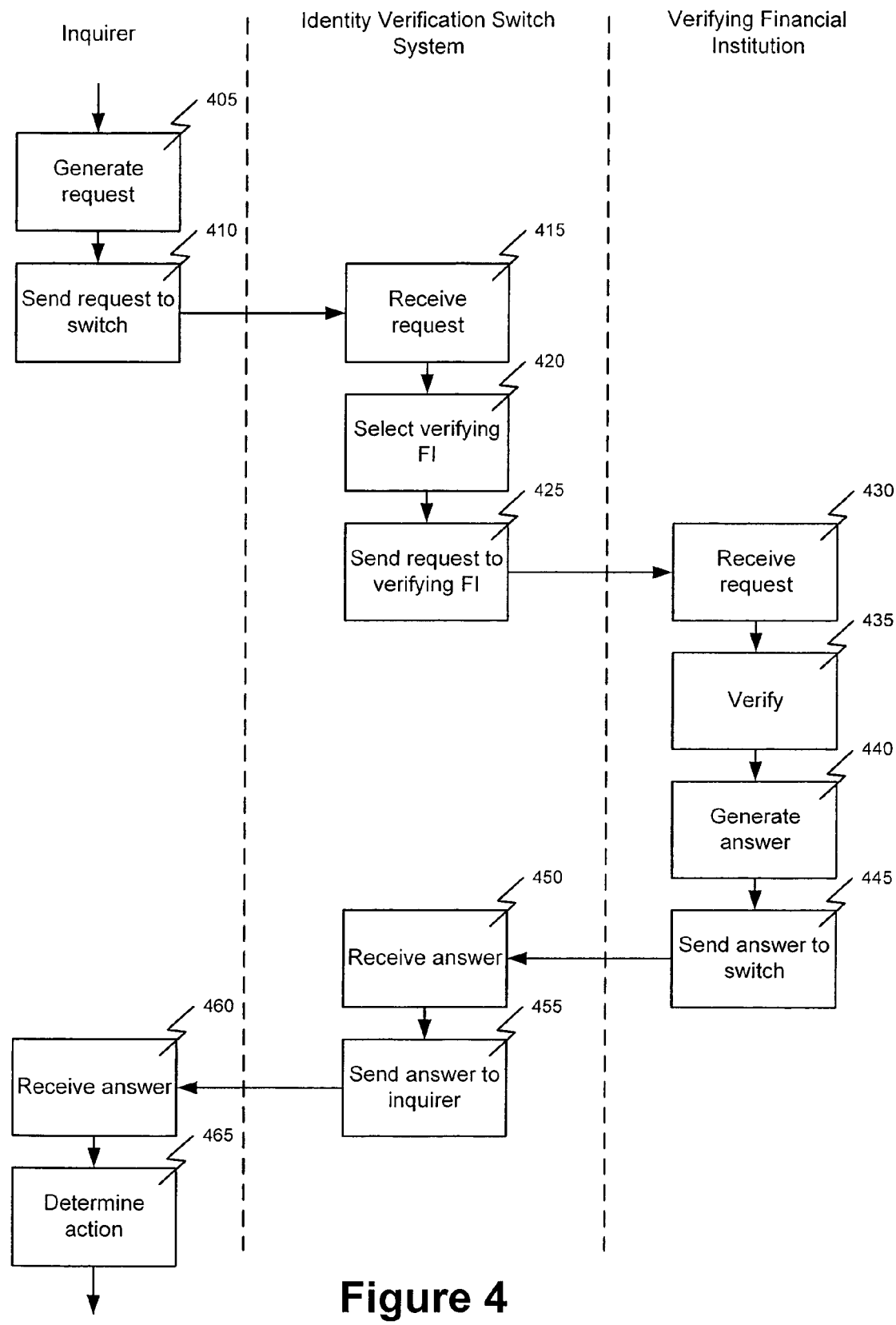
FIG. 4 is flowchart illustrating, at a high level, a process for verifying an identity according to one embodiment.

FIG. 4 is flowchart illustrating, at a high level, a process for verifying an identity according to one embodiment. According to this example, verifying an identity comprises the inquirer generating 405 a request to verify an identity of an individual initiating a transaction. As discussed above, an inquirer such as a merchant, financial institution, or other entity may collect information related to an account subject to a transaction and an individual initiating the transaction. Therefore, the request can include the account information for the account subject to the transaction and the identity information for the individual initiating the transaction. An exemplary request will be discussed below with reference to FIG. 7. Once the request has been generated 405, the inquirer sends 410 the request to the identity verification switch system.

The identity verification switch system receives 415 from the inquirer the request to verify the identity of the individual initiating the transaction. Based on the request, the identity verification switch system selects 420 a verifying financial institution from one or more participating financial institutions. For example, the account information from the request can comprise a Routing Transit (RT) number. In this case, selection 420 of the verifying financial institution from one or more participating financial institutions can be based on the RT number.

Once the verifying financial institution has been selected 420, the request can be forwarded 425 to the verifying financial institution for verification of the identity information. The verifying financial institution receives 430 the request and verifies 435 the identity information contained therein. Verification 435 of the identity information can comprise determining whether the individual is authorized to conduct transactions on the account. This determination can be based on the identity information from the request and account information maintained by the verifying financial institution. That is, the verifying financial institution can check the account information from the request against its own account information to obtain identity information related to individuals authorized to use that account. Then the verifying financial institution can check this identity information against the identity information from the request.

The verifying financial institution also generates 435 an answer based on the verification. As will be discussed in detail below with reference to FIG. 7, the answer can comprise positive indications corresponding to identity information from the request that matches identity information for individuals authorized to conduct transactions on the account maintained by the verifying financial institution, negative indications corresponding to identity information from the request that does not match identity information for individuals authorized to conduct transactions on the account maintained by the verifying financial institution, and/or cautionary indications corresponding to identity information from the request that is not found in identity information for individuals authorized to conduct transactions on the account maintained by the verifying financial institution.

This answer is sent 440 back to the identity verification switch system. The identity verification switch system receives 445 the answer indicating results of verification of the identity information from the verifying financial institution and returns 450 the answer to the inquirer. The inquirer receives 455 the answer and determines 460, based on the contents of the answer, what actions to take. For example, if the answer indicates that all information from the request has been verified, the inquirer may decide to proceed with the transaction. However, if the answer indicates that some information from the request can not be verified, i.e., there are negative or cautionary responses for some elements of the request, the inquirer may decide to place a hold on the transaction or cancel the transaction.

Figure 5:
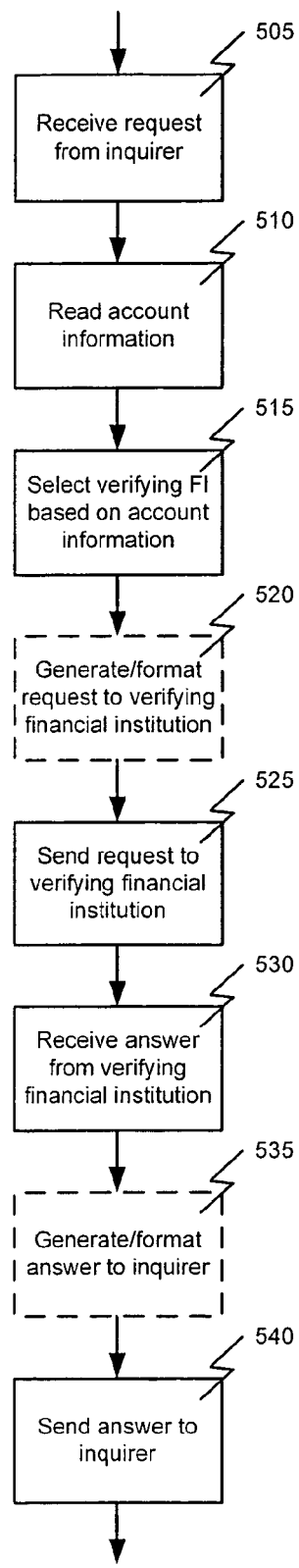
FIG. 5 is a flowchart illustrating an identity verification switch system process for verifying an identity according to one embodiment.

FIG. 5 is a flowchart illustrating an identity verification switch system process for verifying an identity according to one embodiment. In this example, the identity verification switch system receives 505 a request to verify an identity of an individual initiating a transaction from the inquirer. As described above, the request may include account information such as a routing transit number, an account number, etc. as well as identity information such as a name, phone number, address, Social Security number, date of birth, etc related to an individual or entity initiating a transaction.

The identity verification switch system then reads 510 the account information from the request. Based on this information from the request, the identity verification switch system selects 515 a verifying financial institution from one or more participating financial institutions. For example, the account information from the request can comprise a Routing Transit (RT) number. In this case, selection 515 of the verifying financial institution from one or more participating financial institutions can be based on the RT number.

The identity verification switch system can optionally generate 520 or format the request to the verifying financial institution. That is, the identity verification switch system may generate a new request, separate from the message received from the inquirer or may reformat the received request. In some cases, the format of the new request may depend on the verifying financial institution to which it will be sent. That is, some participating financial institutions may require request in different formats than others. However, generation of a new request or reformatting of the received request is considered optional since the original request received from the inquirer may be passed directly to the verifying financial institution as it is received from the inquirer.

The request, original, reformatted, or newly generated, can be forwarded 525 to the verifying financial institution for verification of the identity information. In return, the identity verification switch system receives 530 an answer from the verifying financial institution. As will be discussed in detail below with reference to FIG. 7, the answer can comprise positive indications corresponding to identity information from the request that matches identity information for individuals authorized to conduct transactions on the account maintained by the verifying financial institution, negative indications corresponding to identity information from the request that does not match identity information for individuals authorized to conduct transactions on the account maintained by the verifying financial institution, and/or cautionary indications corresponding to identity information from the request that is not found in identity information for individuals authorized to conduct transactions on the account maintained by the verifying financial institution.

The identity verification switch system can optionally generate 535 or format the answer from the verifying financial institution. That is, the identity verification switch system may generate a new answer, separate from but based on the answer received from the verifying financial institution or may reformat the received answer. In some cases, the format of the new answer may depend on the verifying financial institution and/or the inquirer to which it will be sent. That is, some inquirers may require answers in different formats than others. However, generation of a new answer or reformatting of the received answer is considered optional since the original answer received from the verifying financial institution may be passed directly to the inquirer as it is received from the verifying financial institution. The answer, original, reformatted, or newly generated, can be returned 540 to the inquirer for a decision on how or whether to proceed with the transaction.

Figure 6:
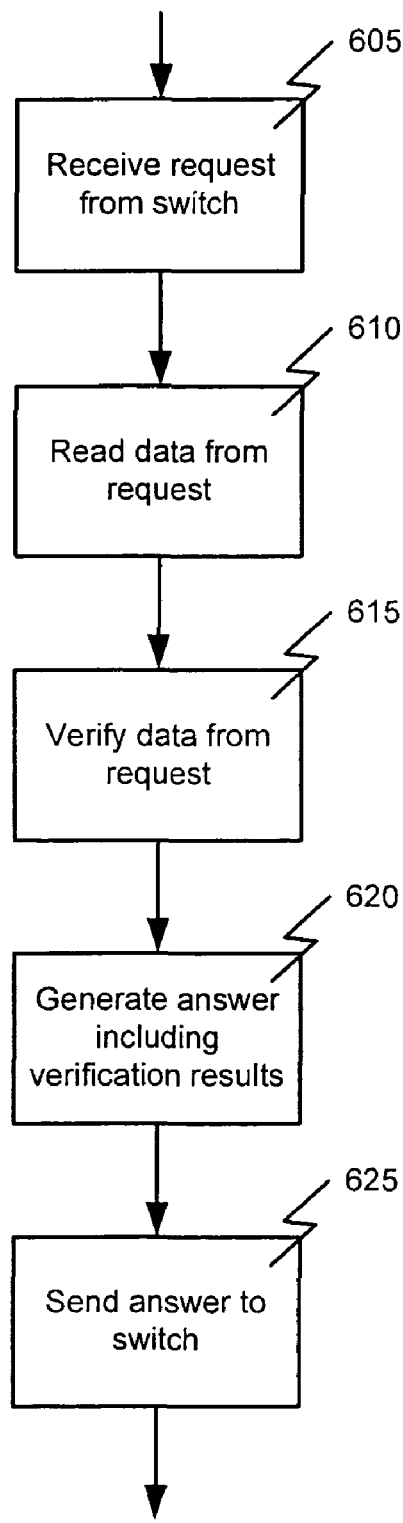
FIG. 6 is a flowchart illustrating a process for verifying request information received from an identity verification switch system according to one embodiment.

FIG. 6 is a flowchart illustrating a process for verifying request information received from an identity verification switch system according to one embodiment. In this example, the verifying financial institution receives 605 the request from the identity verification switch system and reads 610 the request data. That is, the verifying financial institution reads both the account information and the identity information from the request.

The verifying financial institution verifies 615 the identity information contained in the request. Verification 615 of the identity information can comprise determining whether the individual is authorized to conduct transactions on the account. This determination can be based on the identity information from the request and account information maintained by the verifying financial institution. That is, the verifying financial institution can check the account information from the request against its own account information to obtain identity information related to individuals authorized to use that account. Then the verifying financial institution can check this identity information against the identity information from the request.

The verifying financial institution can generate 620 an answer based on the verification 615. The answer includes results of the verification 615. As will be discussed in detail below with reference to FIG. 7, the answer can comprise positive indications corresponding to identity information from the request that matches identity information for individuals authorized to conduct transactions on the account maintained by the verifying financial institution, negative indications corresponding to identity information from the request that does not match identity information for individuals authorized to conduct transactions on the account maintained by the verifying financial institution, and/or cautionary indications corresponding to identity information from the request that is not found in identity information for individuals authorized to conduct transactions on the account maintained by the verifying financial institution. This answer is sent 625 back to the identity verification switch system to be returned to the inquirer.

Figure 7:
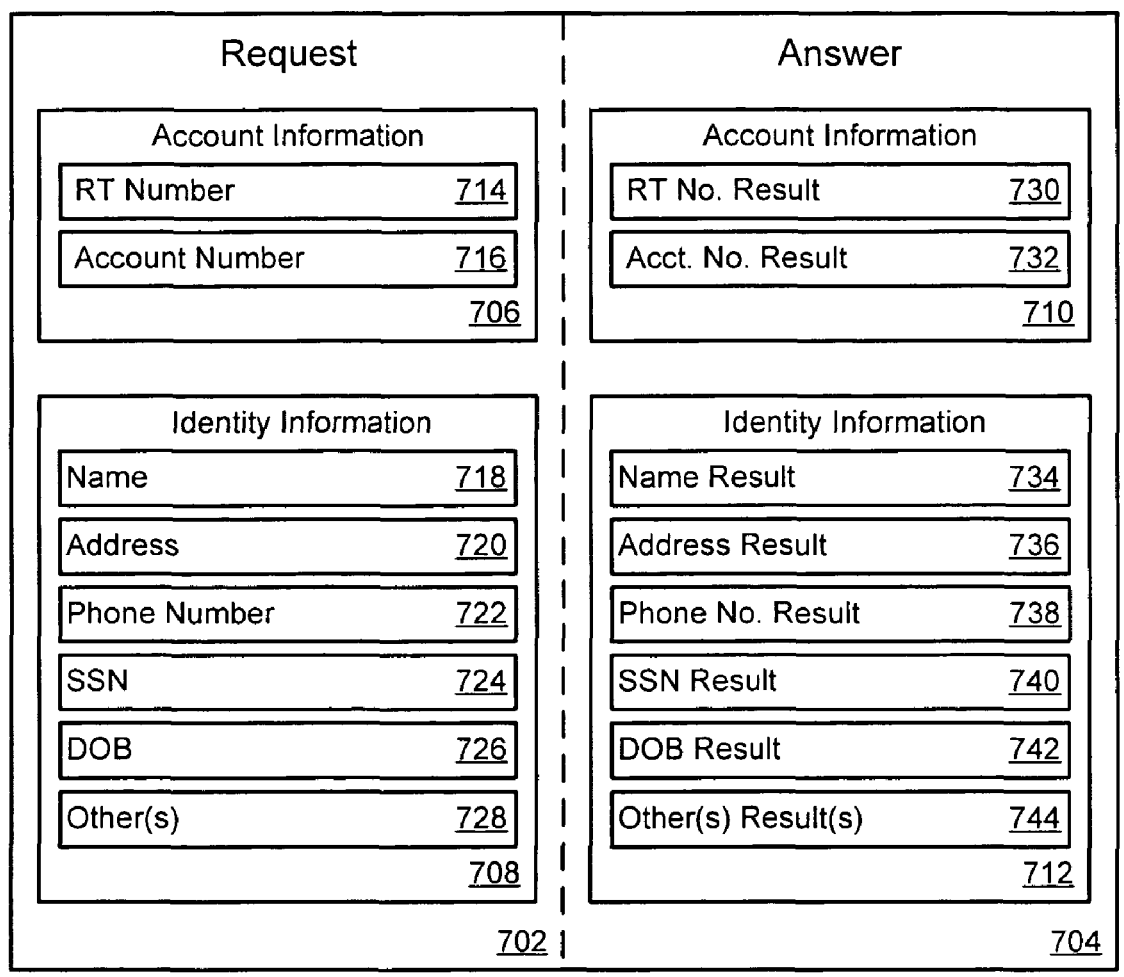
FIG. 7 is a block diagram illustrating an inquiry message and an answer message according to one embodiment.

FIG. 7 is a block diagram illustrating an inquiry message and an answer message according to one embodiment. As illustrated here, the inquiry or request message 702 and the answer message 704 are shown together. According to one embodiment, the answer message 704 may be appended or added to the request message 702 and the combined message 700 may be sent back to the inquirer. Alternatively, the answer message 704 may be separate from the request message 702 and sent back to the inquirer as a stand-alone message rather than appended or added to the request message 702.

As discussed above, the request message 702 can include account information 706 for an account subject to the transaction and identity information 708 for the individual initiating the transaction. The account information 706 of the request message 702 can comprise a Routing Transit (RT) number 714 and an account number 716 which can be used by the identity verification switch system to select the verifying financial institution from one or more participating financial institutions and by the verifying financial institution to verify the identity information 708 as described above.

Identity information 708 included in the request message 702 can vary widely but generally comprises information relating to or identifying the individual initiating the transaction. As illustrated in this example, identity information 702 can include, but is not limited to, a name 718, address 720, phone number 722, Social Security Number (SSN) 724, Date of Birth (DOB) 726, and/or other information 728 like a driver's license number, etc.

The answer message 704 corresponds to the request message 702 and generally, but not necessarily, includes the same or similar fields. For example, the answer message 704 can include account information 710 for an account subject to the transaction and identity information 712 for the individual initiating the transaction. As illustrated in FIG. 7, the account information 710 of the answer can include Routing Transit (RT) number result 730 and/or an account number result 732 corresponding to the RT number 714 and account number 716 of the account information 706 of the request message 702. Similarly, the identity information of the answer message 704 can include fields corresponding to those of the request message 702 such as a name result 734, address result 736, phone number result 738, Social Security Number (SSN) result 740, Date of Birth (DOB) result 742, and/or other information 744.

The result fields in the answer message can comprise positive indications corresponding to identity information from the request that matches identity information for individuals authorized to conduct transactions on the account maintained by the verifying financial institution. For example, a "Y" character or other textual, graphic, or other format indication can be used to indicate a positive result for verification of a particular field when the data of that field in the request matches the corresponding data maintained by the verifying financial institution. Conversely, the result fields can comprise negative indications corresponding to identity information from the request that does not match identity information for individuals authorized to conduct transactions on the account maintained by the verifying financial institution. For example, a "N" character or other textual, graphic, or other format indication can be used to indicate a negative result for verification of a particular field when the data of that field in the request does not match the corresponding data maintained by the verifying financial institution. Further, the results can comprise cautionary indications corresponding to identity information from the request that is not found in identity information for individuals authorized to conduct transactions on the account maintained by the verifying financial institution. For example, a "U" character or other textual, graphic, or other format indication can be used to indicate an unknown data of a particular field when the field in the request is not found in the data maintained by the verifying financial institution.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   electronically receiving at an electronic identity verification switch system from an inquirer a request to verify an identity of an individual initiating a transaction, the request including a plurality of data elements representing account information for an account subject to the transaction and identity information for the individual initiating the transaction;
   selecting, with the electronic identity verification switch system and based on the request, a verifying financial institution from one or more participating financial institutions;
   electronically forwarding the request from the electronic identity verification switch system to the verifying financial institution, wherein the verifying financial institution verifies the account information and the identity information of the request against data electronically stored by the verifying financial institution;
   electronically receiving at the electronic identity verification switch system from the verifying financial institution an answer including results of verification for each of the plurality of data elements of the request, wherein the answer comprises a plurality of data elements corresponding to the plurality of data elements of the request, wherein the answer comprises a separate indication for each data element of whether each data element is verified against data electronically stored by the verifying institution;
   electronically returning the answer from the electronic identity verification switch system to the inquirer, wherein the inquirer assesses the individual data elements in the answer to determine the risk of completing the transaction;
   in response to the determined risk being accepted by the inquirer, the inquirer successfully completing the transaction;
   in response to the determined risk being unaccepted by the inquirer, the inquirer canceling the transaction; and
   in response to the determined risk being uncertain by the inquirer, the inquirer requesting additional data elements of the account information or identity information and the inquirer determining whether the additional data elements create an accepted or unaccepted risk, in order to complete the transaction or cancel the transaction, accordingly.

2. The method of claim 1, wherein the account information from the request comprises a Routing Transit (RT) number.

3. The method of claim 2, wherein selecting the verifying financial institution from one or more participating financial institutions is based on the RT number.

4. The method of claim 1, wherein verification of the identity information comprises determining whether the individual is authorized to conduct transactions on the account based on the identity information from the request and account information maintained by the verifying financial institution.

5. The method of claim 4, wherein the answer comprises positive indications corresponding to identity information from the request that matches identity information for individuals authorized to conduct transactions on the account maintained by the verifying financial institution.

6. The method of claim 4, wherein the answer comprises negative indications corresponding to identity information from the request that does not match identity information for individuals authorized to conduct transactions on the account maintained by the verifying financial institution.

7. The method of claim 4, wherein the answer comprises cautionary indications corresponding to identity information from the request that is not found in identity information for individuals authorized to conduct transactions on the account maintained by the verifying financial institution.

8. The method of claim 1, further comprising reformatting the request with the identity verification switch system prior to forwarding the request to the verifying financial institution, wherein the reformatting the request is based on a format required by the verifying financial institution.

9. The method of claim 8, wherein reformatting the request comprises generating a new request message.

10. The method of claim 8, further comprising reformatting the answer with the identity verification switch system prior to returning the answer to the inquirer, wherein the reformatting the answer is based on a format required by the inquirer.

11. The method of claim 10, wherein reformatting the answer comprises generating a new answer.

12. The method of claim 1, wherein the inquirer comprises a merchant, the transaction comprises a purchase, the account comprises a checking account, and the individual initiating the transaction comprises a purchaser paying for the purchase with a check drawn on the checking account.

13. The method of claim 1, wherein the one or more financial institutions comprises a plurality of financial institutions and the inquirer comprises a financial institution of the plurality of financial institutions other than the verifying financial institution.

14. A method comprising:
- electronically receiving at an electronic identity verification switch system from an inquirer a request to verify an identity of an individual initiating a transaction, the request including a plurality of data elements representing account information for an account subject to the transaction and identity information for the individual initiating the transaction;
- selecting, with the electronic identity verification switch system and based on the request, a verifying financial institution from one or more participating financial institutions;
- electronically forwarding the request from the electronic identity verification switch system to the verifying financial institution, wherein the verifying financial institution verifies the account information and the identity information of the request against data electronically stored at the verifying institution;
- electronically receiving at the electronic identity verification switch system from the verifying financial institution an answer including results of verification for each of the plurality of data elements of the request, wherein the answer comprises a plurality of data elements, each of the plurality of data elements in the answer corresponding to one of the plurality of data elements in the request, wherein the answer comprises a separate indication for each data element of whether each data element is verified against data electronically stored at the verifying institution;
- electronically returning the answer, including each of the corresponding data elements in the answer, from the electronic identity verification switch system to the inquirer, wherein the inquirer assesses the individual data elements in the answer to determine the risk of completing the transaction;
- in response to the determined risk being acceptable to the inquirer, the inquirer successfully completing the transaction;
- in response to the determined risk being unacceptable to the inquirer, the inquirer canceling the transaction; and
- in response to the determined risk being uncertain to the inquirer, the inquirer requesting additional data elements of the account information or identity information and the inquirer determining whether the additional data elements create an acceptable or unacceptable risk, in order to complete the transaction or cancel the transaction, accordingly.

* * * * *